United States Patent [19]

Hardy et al.

[11] 4,187,638
[45] Feb. 12, 1980

[54] METHOD AND APPARATUS FOR APPLYING CHEMICALS TO WEEDS AND PLANTS

[76] Inventors: James H. Hardy, P.O. Box 259, Tr. 2; James E. Roberson, 220 Bates St., both of Batesville, Miss. 38606

[21] Appl. No.: 945,875

[22] Filed: Sep. 26, 1978

[51] Int. Cl.² .............................................. A01N 5/00
[52] U.S. Cl. ........................................ 47/1.5; 239/145; 239/159
[58] Field of Search .................... 239/145, 44–51, 239/159; 47/1.5

[56] References Cited

U.S. PATENT DOCUMENTS

| | | | |
|---|---|---|---|
| 910,933 | 1/1909 | Mahanay | 47/1.5 |
| 1,507,595 | 9/1924 | Goode | 47/1.5 |
| 1,527,669 | 2/1925 | Camp | 47/1.5 |
| 1,764,952 | 6/1930 | Hay | 47/1.5 |
| 2,123,988 | 7/1938 | Corley | 47/1.5 |
| 2,311,782 | 2/1943 | Segars | 47/1.5 |
| 2,769,668 | 11/1956 | Richards | 239/145 |
| 3,021,642 | 2/1962 | Ewing | 47/1.5 |
| 3,320,694 | 5/1967 | Biron | 47/1.5 |
| 3,651,600 | 3/1972 | Ewing | 47/1.5 |
| 4,019,278 | 4/1977 | McKirdy | 47/1.5 |

*Primary Examiner*—Robert E. Bagwill
*Attorney, Agent, or Firm*—Brisebois & Kruger

[57] ABSTRACT

The apparatus includes an elongated hollow body with exposed portions of wick extending along the body and having inner portions extending into the body through openings of the body. Each end of an exposed portion is peripherally sealed with respect to the body opening through which it extends, and inner portions of the wick communicate with a chemical in the body. Exposed portions of the wick span the length of the body and the chemical is applied by moving the body horizontally across a field in a direction transverse to its length. The wick material can be braided nylon rope, and the body can be made of any selected length for multi-row application of the chemical.

25 Claims, 6 Drawing Figures

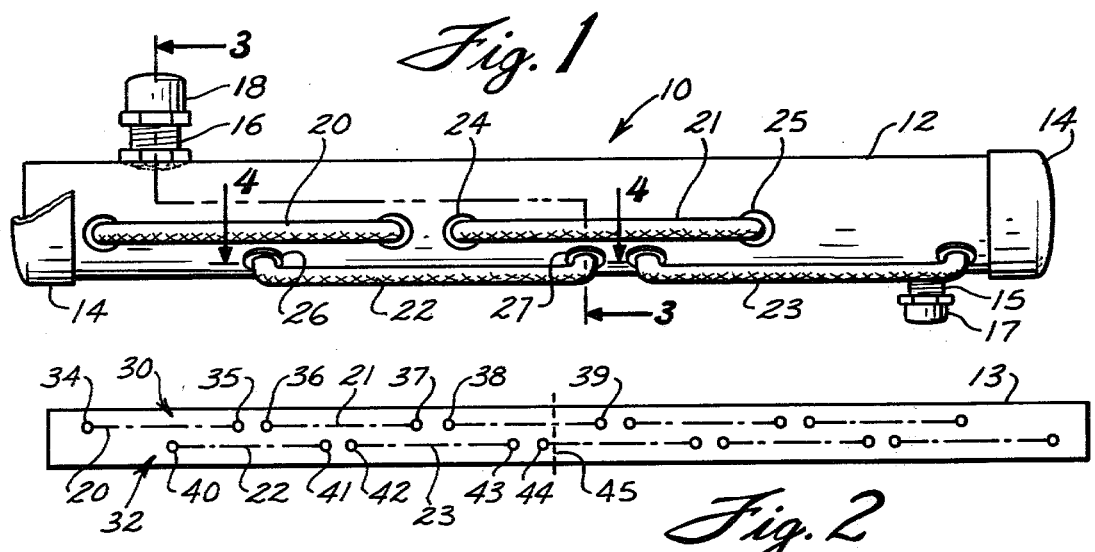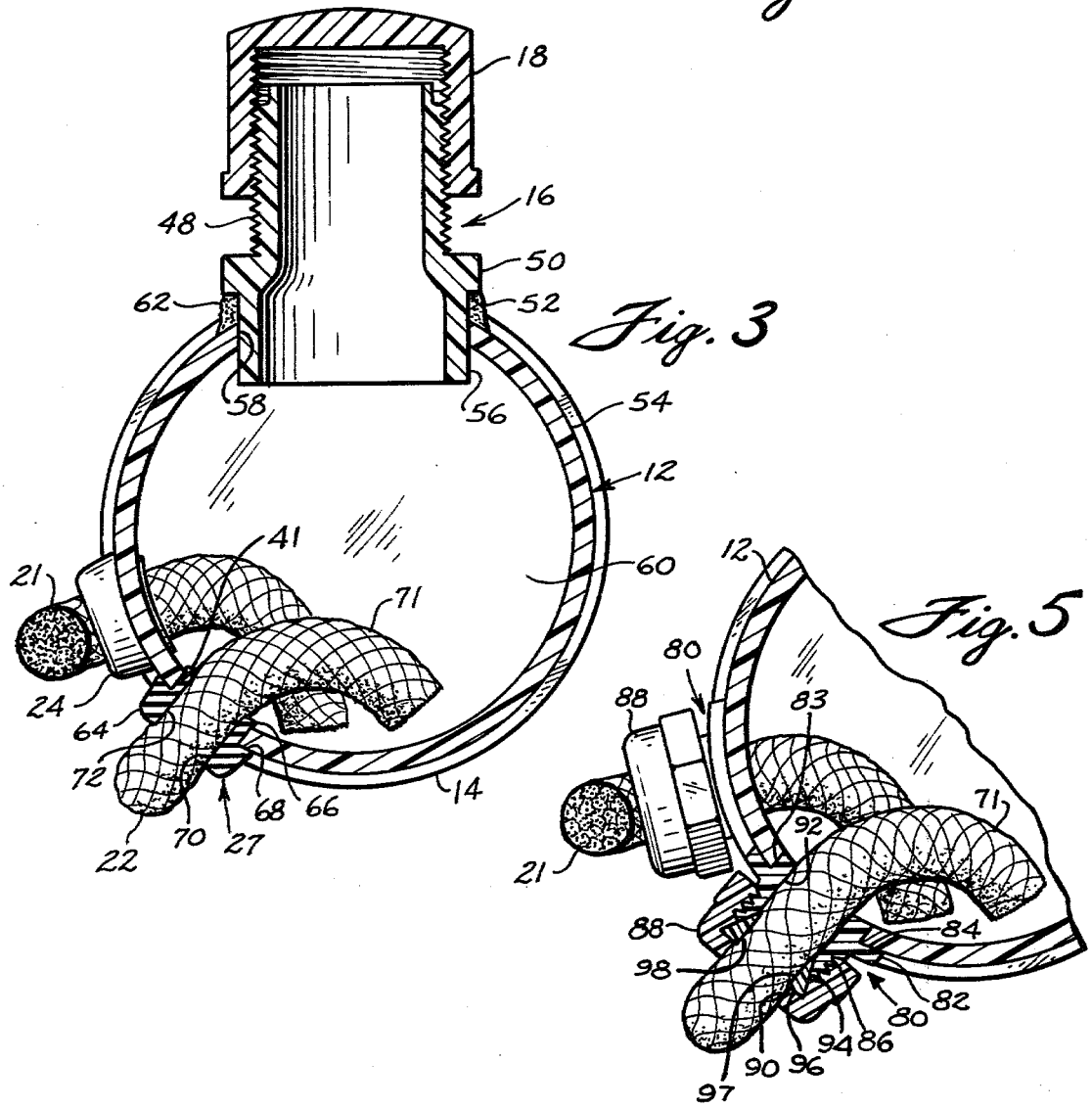

METHOD AND APPARATUS FOR APPLYING CHEMICALS TO WEEDS AND PLANTS

BACKGROUND OF THE INVENTION

This invention relates to a unique apparatus for applying chemicals to plants such as crops and weeds.

The invention also relates to a unique method of using the apparatus.

While the apparatus can be used to apply virtually any type of chemical or liquid to plants, the method and apparatus of this invention have particular utility for the application of a herbicide to weeds in a field which have grown higher than the crop.

Non-selective herbicides are presently available which can kill virtually any plant simply by applying a very small amount of the herbicide to a small area of foilage of the plant. Such herbicides are used extensively to kill undesirable vegetation such as weeds or Johnson grass which have grown to a height greater than the desirable cultivated crop, such as cotton.

One commercially used technique for applying such a non-selective herbicide to weeds taller than the crop, is a spray-recovery system, where the herbicide is sprayed above the level of the cultivated crop, to contact the portions of weeds which have grown higher than the crop, and the excess sprayed weed killer is collected in a recovery receptacle and is recycled back to the sprayer. While such a system and technique is satisfactory, and applies the weed killer primarily to the weeds without application to the cultivated crop, the equipment is quite expensive, and clogging of the recirculation system sometimes occurs, especially under dusty conditions.

Correspondingly, there is a need for an inexpensive, durable, and reliable apparatus for applying chemicals to field crops. This invention provides such an apparatus, as well as a unique method of applying chemicals to plants with the apparatus.

FIELD OF THE INVENTION

The invention relates to apparatus for applying herbicides and other chemicals to weeds or plants growing in a field by drawing the apparatus across the field with wick portions of the apparatus at a predetermined height and disposition to contact and moisten the plants. The invention is especially useful for applying herbicides to undesirable vegetation which has grown taller than the cultivated crop.

DESCRIPTION OF THE PRIOR ART

As previously mentioned, it is known to use a spray-recovery system to apply chemicals only to plants higher than the cultivated crop growing in a field.

Known prior art U.S. patents for applying a liquid chemical to plants are:

| U.S. Pat. No. | Patentee |
| --- | --- |
| 910,933 | Mahanay |
| 1,507,595 | Goode |
| 1,527,669 | Camp |
| 1,764,952 | Hay |
| 2,123,988 | Corley |
| 2,311,782 | Segars |
| 3,320,694 | Biron |
| 4,019,278 | McKirdy |

Mahany and Camp disclose the use of cloths supplied with a chemical from a reservoir or piping, and which contact the plants to apply the chemical. Such cloths quickly deteriorate and are torn, and in addition, it is difficult to prevent dripping of the chemical from the cloths onto the cultivated crop when herbicides are used.

Hay, Segars ad Corley disclose mop-type wick applicators which wear out quickly and frequently drip thereby either wasting some of the chemical or dripping the chemical onto the cultivated crop when herbicides are used.

Biron and McKirdy relate to perforated tube applicators covered with a sleeve which is moistened and applies the chemical to the crop. Such sleeves wear out quickly and dripping is not uncommon, unless a chemical of relatively thick consistency is used as in Biron, but the use of a thick chemical requires a pressure source to force the chemical to the applicator sleeve.

Goode requires multiple bars of felt on a rotatable drum to apply the chemical to the plants. Such a rotatable drum is expensive and requires a substantial amount of relatively expensive felt as the applicator material.

SUMMARY OF THE INVENTION

In accordance with this invention, the shortcomings and problems of the prior art devices are alleviated by providing a very inexpensive but durable applicator for applying a chemical to plants by drawing the applicator across a field while horizontal and at a predetermined height.

In accordance with the invention, a body portion of the apparatus takes the form of a length of plastic pipe with closed ends and of sufficient diameter to form a reservoir for the chemical. There is a filling opening to permit filling the body with the chemical, and a plurality of rope-like wick elements each of a predetermined exposed length on the outside of the body. Each wick is connected to the body at each end of the exposed length, so that there are no dangling or badly drooping portions of the exposed length which could cause dripping of the chemical. The portions of the wicks connected to the body are lengths of the wicks which are continuations of the exposed portions, and those continuation lengths of the wicks communicate with the interior of the body and cause the chemical to wick to the exposed lengths. These continuation lengths of the wicks are unexposed and each continuation length is sealed with respect to the body at a location between the portion of the length communicating with the body and the exposed length to prevent the chemical from flowing from the body along the outer surface of the wick.

In one preferred embodiment, the lengths of the wicks which communicate with the body extend through openings in the body and have free ends in the body. In this embodiment the seals are rings or grommets, preferrably resilient, which encircle and seal the wicks to the body adjacent the body openings.

In another embodiment, the continuation lengths of the wicks are sealed with respect to the body by seals on nipples or pipes connected to and communicating with the interior of the body. These seals can be energized by a compression nut or fitting.

In each embodiment, the wicks each take the form of a length of rope of a synthetic material such as DACRON, NYLON, or polypropylene, solid braided NYLON rope being preferred. While cotton rope can be used with some chemicals, cotton rope does not wick properly with most weed killers.

Advantageously, the wick elements are held rigidly by the body and the rope-like wicks are quite durable and resistant to abrasion and wearing out by contact with even sharp bladed weeds. By virtue of this construction, where durable wicks are used, and the wicks are maintained in a predetermined pattern on the body, the applicator is easy to use and manipulate, and dripping of chemical is wholly avoided since there are no dangling ends where the chemical tends to accumulate.

The exposed lengths of the wicks are preferably parallel to each other and extend along the outside of the body. The exposed lengths of the wicks form an overlapping array longitudinally of the body to assure application of the chemical to plants along the entire length of the body. In the preferred embodiment, the wicks are parallel to the length of the body.

Advantageously, the exposed lengths of the wicks extend along only a predetermined sector of the body, this sector being less than one-half the circumference of the body so that the exposed lengths of the wicks are all on the same side of the body, this sector preferably not exceeding 90°. The applicator is used by for example, mounting it on the hydraulic lift mechanism of a tractor, in a horizontal position transverse to the tractor, and moving the tractor across the field. Mounting the apparatus on the lift mechanism facilitates adjustment of the height of the applicator so that the applicator can be maintained just above the top of the cultivated crop and weeds at a height greater than the crop are engaged by the wicks to apply the herbicide only to the weeds. The applicator is mounted on the tractor so that the sector with the exposed lengths of the wicks faces forwardly and downwardly to effectively cause the wicks to contact the weeds.

Correspondingly, it is an object of this invention to provide an apparatus for applying a chemical to plants which is rugged, durable, and applies only a desired amount of the chemical to the plants.

Another object is a weed killer applicator for plants fabricated from primarily plastic materials and using rope wicks in a predetermined array along the length of the applicator to apply a weed killer to weeds of a height greater than the cultivated crop, by moving the applicator across a field at a height just above the height of the cultivated crop.

An additional object is a weed killer applicator of unique construction which can be formed in any desired length, which is quite inexpensive to manufacture so that it can be sold at a price as little as 10% of the price of previous commercial weed killer applying apparatus, is extremely simple in construction, yet is durable, long-lasting, and applies the desired amount of the weed killer.

A further object is a wick-type weed killer applicator in which the wicks take the form of lengths of plastic material rope, preferably braided, and which can be NYLON, DACRON, or prolypropylene, with solid braided NYLON rope being preferred.

A further object is a method of applying weed killer by using the applicator of the preceding objects.

A further object is a method of applying a weed killer in which the wick for applying the weed killer consists of a nylon braided rope having its ends communicating with the liquid weed killer.

Additional objects, features, and advantages of the invention will become apparent with reference to the accompanying drawings.

BRIEF DESCRIPTION OF THE DRAWINGS

FIG. 1 is a front view of the apparatus, according to this invention, for applying chemicals to plants, with portions cut away for purposes of illustration;

FIG. 2 is a view of a body on a smaller scale rotated upwardly with respect to the position of FIG. 1, and showing the hole pattern formed in the body for receiving the wick elements;

FIG. 3 is an enlarged view in section taken along line 3—3 of FIG. 1;

FIG. 5 is a partial view corresponding to FIG. 3 and showing a second embodiment of a seal arrangement according to the invention for sealing the wick to the body; and, FIG. 6 is a view in front elevation showing use of the apparatus.

DETAILED DESCRIPTION OF PREFERRED EMBODIMENT

Figure 4:
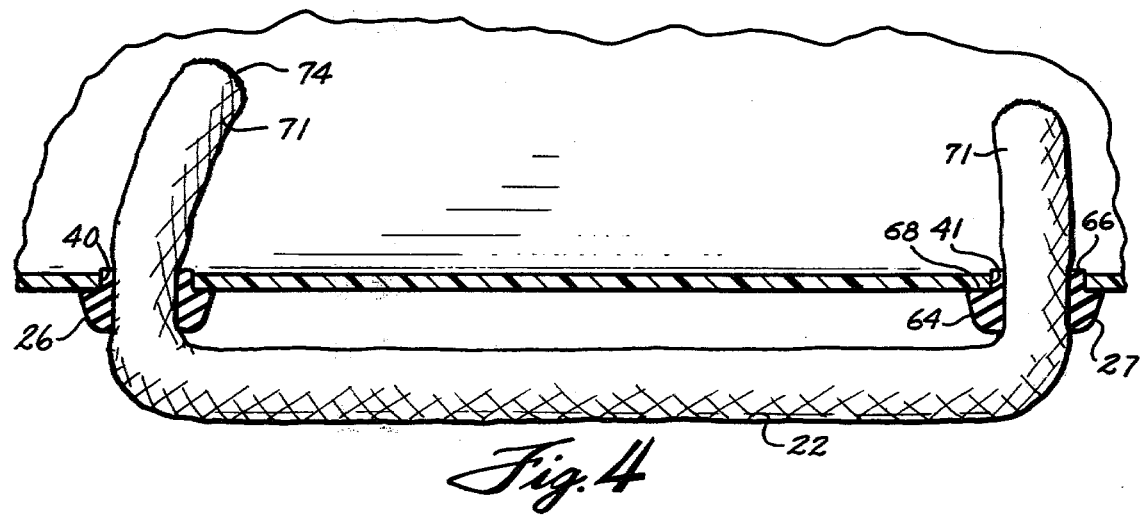
FIG. 4 is an enlarged partial view in section taken generally along line 4—4 of FIG. 1, but perpendicular to the radius of the body.

With reference to the drawings, and particularly FIG. 1, there is shown a weed killer applicator 10 in accordance with this invention. Applicator 10 includes an elongated hollow body 12 of extruded plastic material which is of essentially uniform section along its length. The ends of body 12 are closed by end caps 14 which are sealed to each end of the body with a suitable cement so that the body and end caps form a reservoir for the chemical to be applied to the plants. Mounted on body 12 adjacent one end of the body is a filling neck 16 which is closed with a threaded cap 18. There is also a drain 15 at the bottom and normally it is closed by a cap 17.

On the outside of body 12 are exposed lengths of wick 20-23 each of which is of circular cross-section. Each length of wick extends into the interior of body 12 through two annular seals such as seals 24, 25, located at the opposite ends of exposed portion 21, and seals 26 ad 27 located at the opposite ends of exposed portion 22. As will soon be described, in accordance with one embodiment of this invention, these seals take the form of rubber grommets.

FIG. 2 shows a length of body material 13 from which the body 12 of FIG. 1 can be formed. Body material 13 is preferably 3" nominal diameter PVC pipe which has an inside diameter of 3" and a wall thickness of approximately ⅛". This pipe is commonly available under the name "Western Soil Pipe" or Schedule 26 PVC pipe with working pressure of 160 PSI. As shown in FIG. 2 there is a pattern of openings formed in body material 13 to receive near or unexposed portions of the wicks. As shown, there is a first or upper row of openings 30 and a second or lower row of openings 32. Openings of row 30 include pairs of two openings such as pairs of 34, 35, pairs 36, 37, and pairs 38, 39. Row 32 simlarly has pairs of openings 40, 41, and pairs of openings 42, 43. As is evident from FIG. 2, the row of openings 30 is parallel to the row of openings 32 and each of these rows is parallel with the longitudinal axis of the body. The openings of rows 30 and 32 can be drilled through the wall of the body, or can be formed in any other suitable manner. It is to be noted that the body 12 of FIG. 1 is shorter than the length of body material 13 as shown at FIG. 2. To form body 12, body material 13 is formed only with openings 34–37 and 40–43. Additional openings such as 38 and 44 are not formed, and body material 13 is cut along dotted line 45.

The applicator shown at FIG. 1 is called a one row applicator, since the length of body 12 spanned by exposed lengths 20–23 of the wick equals the center to center distance between the rows of a field in which the applicator is used. As is evident from FIG. 2, the applicator can be made of any desired length to span a plurality of rows, for example, as many as four rows of, for example, a cotton field. The overall length, however, of the body for a certain number of rows will of course depend on the spacing between the rows of the planted crop, and the length of the body spanned by the exposed lengths of wick will be an even multiple of the distance between the rows of field. For cotton, where the distance between rows is 32", the distance spanned by a single row is on the order of 32", and a four-row applicator will then have a body greater than 128" in length. End caps 14 are each schedule 4 PVC pipe caps for use with the 3" nominal diameter PVC pipe from which body 12 is formed. Such caps can be used to close the ends of the body after the body is cut to length, and facilitate constructing the applicator in any desired length.

As shown at FIG. 3, filling neck 16 is of plastic material, preferably PVC, and takes the form of an externally threaded nipple having a flange 50 which presents a shoulder 52 which abuts against the exterior surface 54 of body 12, and has a short integral pipe portion 56 extending through an opening 58 in the body 12 to communicate with the interior 60 of the body. Filling neck 16 is secured and sealed to the body with a plastic material cement 62.

As shown at FIGS. 3 and 4, each grommet such as grommet 27 has a head portion 64 of a greater diameter than a sleeve portion 66 to provide a shoulder 68 between the head and sleeve portions. Extending through grommet 27 is a through opening 70 through which one end of exposed portion 22 of wick extends, to provide an unexposed or inner portion 71 within body 12 to wick the chemical from within the body to the exposed portion by wicking and capillary action. The through opening 70 in grommet 27 is advantageously of a relaxed diameter somewhat less than the diameter of the wick. Such dimensioning causes the grommet to tightly grip and radially compress the portion 72 of the wick which is encircled by the grommet. Such gripping prevents any leakage of the chemical within body 12 along the outside of the wick an also firmly secures the wick on the body. The opening 43 in the body which receives grommet 27 has a diameter such that sleeve portion 66 of the grommet is a force fit in the opening to enhance the gripping action on the wick. When installed, as shown in FIG. 3, shoulder 68 of grommet 27 abuts the outside surface 54 of body 12, and the grommet is secured to the body with a suitable plastic cement.

As shown at FIG. 4, each wick takes the form of a length of the wick material with an exposed length such as 22 and unexposed lengths 71 which extend into body 12, these unexposed lengths each terminating at an end 74. Correspondingly, there are a plurality of separate individual wicks, each wick having both its ends extending through two grommets into the interior of the body 12. These inner ends are wet by the chemical in the body, and the wicks transmit the chemical to their exposed portions outside the body by wick and/or capillary action.

Each wick advantageously takes the form of a length of rope of plastic material, which can be DACRON, NYLON, polypropylene or any other material capable of feeding the chemical to be applied to the plants by wick or capillary action. For applying a weed killer to the plants, excellent results are obtained where the wick is solid braided loose woven NYLON rope.

In the preferred embodiment, the NYLON rope is $\frac{1}{2}$" in diameter. The through opening 70 in a grommet, as previously mentioned, is slightly smaller than the outside diameter of the wick rope. Where the rope is $\frac{1}{2}$" in diameter, the relaxed diameter of through opening 70 is preferably 7/16". This provides the necessary gripping and compression of the rope to prevent leaking of the chemical along the outside of the rope and causes the sleeves to tightly grip the rope. As is evident from FIG. 4, each exposed portion of a wick such as the portion 22, is spaced from the body 12 by the heads of the grommets through which the opposite ends of the wick extends.

Where $\frac{1}{2}$" diameter rope is used as the wicks, the center to center distance of pairs of holes 34, 35 (FIG. 2) and 36, 37 for example, is 8". It is preferred that about 4" of each wick extend into the interior of body 12 to provide the necessary feed action. Correspondingly, each wick is approximately 18" long, with about 8" exposed outside the body and 2" of its length within the body. Depending on the type of chemical to be applied with the applicator, the exposed portion of each wick can be from between about 6" and 10" (rather than 8 inches), and the lengths of the inner unexposed portions 71 can be varied if necessary to provide the desired flow of the chemical to the exposed portions. A preferred spacing between the ends of the exposed portions is approximately $1\frac{1}{2}$" and correspondingly, the distance between the center lines of openings such as 35, 36 and 37, 38 is approximately $1\frac{1}{2}$".

During assembly, it is preferred to first force the opposite ends of a wick through its respective grommets, so that the exposed portion 22 has the desired length. Next, cement is applied to the sleeve 66 and shoulder 68 of each grommet, and the grommets are forced into a selected pair of openings in the body such as openings 40 and 41 to the position shown for wick 22 at FIG. 4.

FIG. 5 shows a second embodiment of the applicator of this invention. This embodiment is in all respects identical to the embodiment of FIGS. 1 and 3 save that a different arrangement is used to seal and secure the wicks to the body. As shown at FIG. 5, instead of the grommets 24 and 27, externally threaded nipples 80 of plastic material are secured to the body at each of the openings through which a wick extends. These nipples each have a flange 82 which seats against the outside of the body, and a short bushing section 83 which extends into a body opening, and which has a length approximating the wall thickness of the body. The flange presents a shoulder 84 which abuts the body. An externally threaded outer pipe portion 86 of the nipple has threaded thereon a cap 88 having a central opening 90 of the same diameter as the through opening 92 in nipple 80. Where the wick is $\frac{1}{2}$" in diameter, openings 90 and 92 are also one-half inch in diameter.

The outer end of pipe portion 86 of the nipple is flared outwardly to provide a frusto-conical seat 94 for a seal ring 96 which can be of trapezoidal or triangular section, and which is disposed between the seat 94 and a transverse annular surface 98 of cap 88. As cap 88 is threaded onto nipple 80, seal ring 96 is forced radially inwardly into tight gripping and sealing engagement with a short length of the exterior surface of the wick. Seal ring 96 can be of rubber or flexible plastic material and has a cylindrical inner surface 97. The extent of compression and sealing of the wick is readily controlled by manipulation of nut 88, which functions as a compression nut.

In the embodiment of FIG. 5, nipples 80 are first secured to the body by inserting the bushing portion 83 into a body opening, and cementing the nipple to the body. Next, a nut 88 and then a seal ring 96 are pushed over each end of a wick, and the wick ends are then inserted through a pair of nipples on the body. The nuts are then threaded onto the threaded portions of the respective nipples and tightened to both seal and grip the opposite ends of the exposed portions of the wick.

Figure 6:
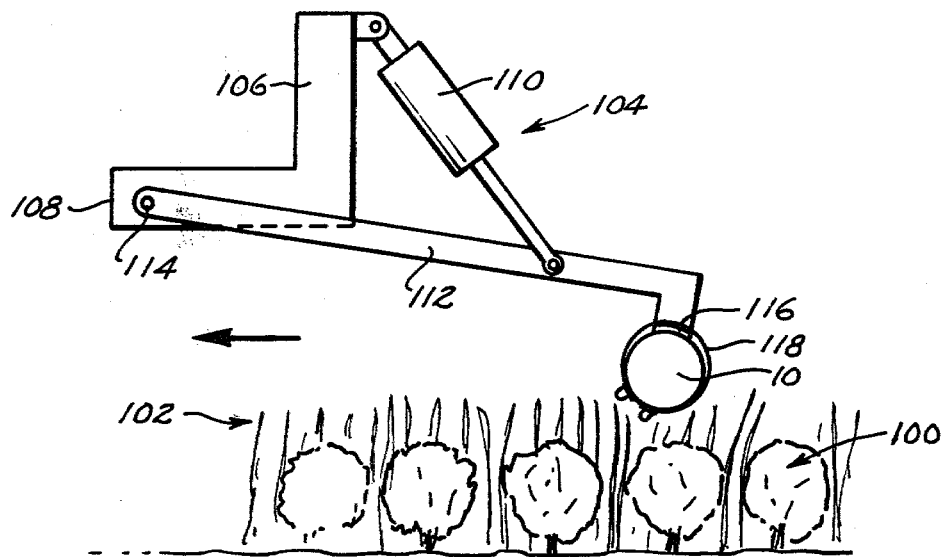

FIG. 6 shows the manner of use of the applicator 10 of both embodiments. In use, applicator 10 after being filled with a suitable herbicide, either selective or nonselective, is drawn across the field with its axis transverse to the rows of the crop, and preferably with the applicator at an elevation slightly above the cultivated plants 100, such as cotton, but below the level of the higher weeds 102, so that the herbicide is applied to the portions of the weeds which grow above the level of the crop. It has been found convenient to mount applicator 10 on the usual hydraulic lift assembly 104 of a tractor. Such lift assemblies include a frame 106, the forward end 108 of which is secured to a tractor (not shown) and which includes one or more hydraulic cylinders 110. Applicator 10 can be mounted at the end of a pivoted bar 112 of the lift assembly which swings up and down about an axis 114 in response to operation of cylinder 110. Applicator 10 can easily be secured, for example, to a flat transversely extending bar 116 of the lift apparatus, in any suitable manner such as with hose clamps 118. Hose clamps 118 can be positioned at spaced intervals around the applicator body under the wick elements.

FIGS. 3 and 5 each show the applicator in a preferred position when in use, for applying a chemical to plants in a field. This position corresponds to the position of FIG. 6 where the applicator is moved to the left. As is evident from FIGS. 3 and 5, the exposed portions of the wicks such as exposed portions 21 and 22 extend forwardly and downwardly with respect to the center of body 12 and are located only along a portion of the body which is less than one-half its circumferential periphery. In the preferred form shown and described, the exposed portions of the wicks extend only along a circumferential sector 120 of the body which is not greater than 90°.

While two preferred embodiments of an apparatus for applying chemical to plants have been shown and described in the environment of an applicator for a weed killer, it is to be understood that the apparatus can be used to apply any desired chemical to plants. It will also be appreciated that numerous changes can be made in the preferred embodiments described herein. For example, body 12 can be square or rectangular rather than circular, and rather than individual wick elements with free or cut ends 74, a single length of wick material can be threaded in and out of the body openings so that several exposed portions along the length of the body are integrally connected by unexposed loops within the body.

What is claimed is:

1. Apparatus for applying a chemical to plants comprising
  an elongate hollow body having an inside for containing a plant treating liquid, and an outside;
  means for introducing a plant treating liquid into said body;
  wick means on said body for applying the plant treating liquid to plants to be treated by contact of the wick means with the plants, said wick means comprising:
    a plurality of wicks supported by the body and having exposed lengths extending along the outside of said body, each such wick having an unexposed length extending from each end of the exposed length and forming a continuation of the exposed length, said unexposed lengths communicating with the interior of said body,
    peripheral seal means between said exposed and unexposed lengths of each of said wicks, and
    seal compressing means mounted on said body for compressing said seal means to peripherally seal each of said wicks with respect to said body.

2. Apparatus according to claim 1 wherein said seal compressing means comprise a plurality of separate seal compressing means each including a threaded element threadedly mounted on said body to compress said seal means in response to rotation thereof relative to the body.

3. Apparatus according to claim 2 wherein said seal compressing means each further comprise a sleeve sealed to said body, and having male threads;
  said threaded elements being hollow and having female threads;
  a length of each of said wicks extends through a sleeve and threaded element;
  said seal means being positioned between said threaded element and said sleeve to compress said seal means in response to screwing the threaded element onto the sleeve.

4. Apparatus according to claim 1 wherein said seal compressing means for each seal means comprises, an externally threaded sleeve sealed to said body, and an internally threaded nut threaded onto said sleeve;
  a length of each wick extends into a sleeve and its associated nut, and
  said seal means comprises an elastic seal ring between said nut and said sleeve.

5. Apparatus according to claim 4 wherein each sleeve includes an internal frustoconical seat;
  each nut comprises a transverse internal shoulder; and
  each seal ring comprises a ring of general triangular section and positioned between a shoulder of a nut and the frustoconical seat of a sleeve.

6. Apparatus according to claim 1 wherein said exposed lengths of said wicks are each parallel to each other, and successive exposed lengths extend beyond each other longitudinally of said body.

7. Apparatus according to claim 1 wherein said exposed lengths of each wick extend in a straight line between the unexposed lengths of each wick.

8. Apparatus according to claim 1 wherein said exposed lengths of each wick extend parallel to the outside of said body.

9. Apparatus according to claim 5 wherein said exposed lengths of each wick extend parallel to the length of said body.

10. Apparatus according to claim 1 wherein said unexposed lengths of each wick communicate with the interior of said body through openings formed in said body in spaced apart relation along the body.

11. Apparatus according to claim 1 wherein said unexposed lengths of each wick extend through said body openings into the inside of said body.

12. Apparatus according to claim 1 wherein said exposed lengths of said plurality of wicks are each of essentially the same length.

13. Apparatus according to claim 1 wherein said unexposed lengths of each of said plurality of wicks comprises opposite ends of each of said wicks.

14. Apparatus according to claim 1 wherein each wick comprises a length of multi-strand plastic material rope.

15. Apparatus for treating vegetation comprising
an elongate tubular body of essential constant cross-section along its length for containing a plant treating liquid;
means for closing the ends of said body;
a filling opening for filling the body with a plant treating liquid;
said body having first and second rows of spaced apart openings along its length; said openings of each row being in predetermined spaced apart relation to each other and said rows extending generally parallel to a longitudinal axis of the body;
wick means on said body for applying the plant treating liquid to plants by contact of the wick means with the plants, said wick means comprising
a plurality of exposed lengths of wick outside said body, continuations of the exposed lengths extending into said body through two of said openings, said exposed lengths each being of essentially the same length and extending between the two openings through which its continuations extend;
a plurality of peripheral seals, one adjacent each end of each exposed length of wich, and
means mounted on said body for movement relative to the body for compressing said seals to seal the wick periphery with respect to the openings through which it extends.

16. Apparatus according to claim 15 comprising,
a plurality of sleeves on said body, one for each of said openings, each sleeve being sealed to the body with respect to its opening;
said means for compressing said seals comprises a plurality of compression elements, one for each sleeve,
said seals each comprise a seal ring between a sleeve and a compression element; and
cooperating means on each sleeve and compression element for securing a compression element to its sleeve with a seal compressed between the compression element and the sleeve.

17. Apparatus according to claim 15 wherein said cooperating means comprise cooperating threads on said sleeve and compression element.

18. Apparatus according to claim 15 wherein said exposed lengths are parallel to each other.

19. Apparatus according to claim 18 wherein said exposed lengths are parallel to the axis of said body.

20. Apparatus according to claim 15 wherein said wick comprises a length of braided plastic material rope.

21. Apparatus according to claim 20 wherein said rope comprises a NYLON rope.

22. Apparatus according to claim 20 wherein said wick means comprises a plurality of separate lengths of wick, and ends of each length extend into said body.

23. Apparatus according to claim 15, wherein said exposed portions of wick span a peripheral sector of the body not greater than 90°.

24. A method of applying a chemical to vegetation comprising
providing an elongate hollow body having a plurality of openings therein on one side of the body,
extending a plurality of wicks through selected ones of the openings so that each end of each wick is in the interior of the body while leaving an exposed length of each wich extending along the outside of the body,
sealing the periphery of each wick with respect to the interior of the body adjacent each opening by compressing the respective seals of a plurality of compression fittings associated respectively with said openings;
filling the body with a chemical; and
applying the chemical to plants in a field by moving the body across the field below the tops of the plants in a direction transverse to its length to engage the plants with the exposed portions of the wicks.

25. A method of applying a chemical to vegetation comprising
extending an exposed portion of a braided nylon rope wick along a body between two openings of a body;
positioning continuations of the ends of said exposed portions in communication with the openings;
peripherally sealing each end of an exposed portion with respect to its opening by tightening a nut of a compression fitting adjacent each opening; and
contacting plants with the exposed portion of the wick while supplying a chemical to the continuation of the ends from said body.

* * * * *